H. C. STEINMETZ.
REPAIR HANGER FOR MOTOR CARS.
APPLICATION FILED JUNE 11, 1919.
1,316,200.
Patented Sept. 16, 1919.
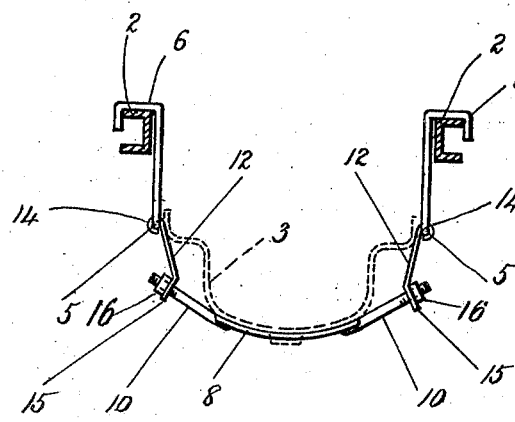
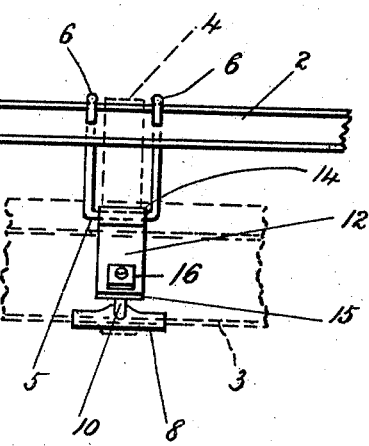
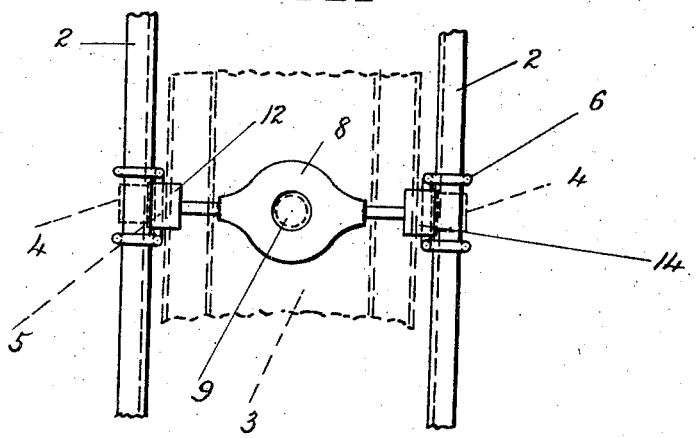
Inventor
Henry C. Steinmetz
by Hubert W. Jenner
Attorney.

UNITED STATES PATENT OFFICE.

HENRY C. STEINMETZ, OF PACIFIC GROVE, CALIFORNIA.

REPAIR-HANGER FOR MOTOR-CARS.

1,316,200.  Specification of Letters Patent.  Patented Sept. 16, 1919.

Application filed June 11, 1919. Serial No. 303,430.

*To all whom it may concern:*

Be it known that I, HENRY C. STEINMETZ, a citizen of the United States, residing at Pacific Grove, in the county of Monterey and State of California, have invented certain new and useful Improvements in Repair-Hangers for Motor-Cars, of which the following is a specification.

This invention relates to devices for supporting the crank cases used on motor cars; and it consists in the novel construction and combination of the parts hereinafter fully described and claimed which are applicable as a brace to reinforce existing crank cases or to wholly support them when their connections are broken.

In the drawings, Figure 1 is an end view of the hanger showing the side bars of the frame of the motor car in cross-section. Fig. 2 is a side view of the same. Fig. 3 is a plan view of the hanger.

The frame of the motor car is provided with two longitudinal side bars 2 of any approved cross-section. The crank case 3 is partially shown in dotted lines in Fig. 1, and it forms the lower part of the frame of the motor, inclosing its crank-shaft and other parts. This crank case 3 is usually supported between the side bars 2 by lugs or brackets 4, but these are sometimes broken by the jolts of the road.

Two loops or bails 5 are provided, and they each have two hooks 6 at their upper ends which are hooked over the side bars 2 so that the bails hang inside or between the side bars. A sling 8 is provided for the bottom of the crank case to rest in, and this sling usually has a hole 9 to clear any projection or oil valve on the bottom of the crank case. The sling has screw-threaded rods 10 at its ends which project upwardly and outwardly under the side bars of the frame. Angle-shaped brackets 12 are provided, and they have eyes 14 on their upper end which are pivoted on the bails 5.

The rods 10 project through holes in the lower parts 15 of the said brackets, and are provided with nuts 16. When the parts are arranged as shown in the drawings, and the nuts are tightened on the rods, the crank case is supported from the side bars independently of its usual connections.

What I claim is:

1. A repair hanger for the crank case of a motor car, comprising two bails provided with means for engaging with the side bars of the car frame, a sling for the crank case having screwthreaded rods at its ends provided with nuts, and angle-shaped brackets pivoted on the said bails and engaging with the said rods and nuts.

2. A repair hanger for the crank case of a motor car, comprising two bails each provided with two hooks at its upper end adapted to hook over the side bars of the car frame with the bails arranged between the said bars, a sling for the crank case having screwthreaded rods at its ends provided with nuts, and angle-shaped brackets pivoted on the said bails and engaging with the said rods and nuts.

In testimony whereof I have affixed my signature.

HENRY C. STEINMETZ.

Copies of this patent may be obtained for five cents each, by addressing the "Commissioner of Patents, Washington, D. C."